May 8, 1962 — L. E. SHUMAKER — 3,032,902
TRACTOR-MOUNTED LAND LEVELER
Filed Oct. 3, 1960 — 2 Sheets-Sheet 1
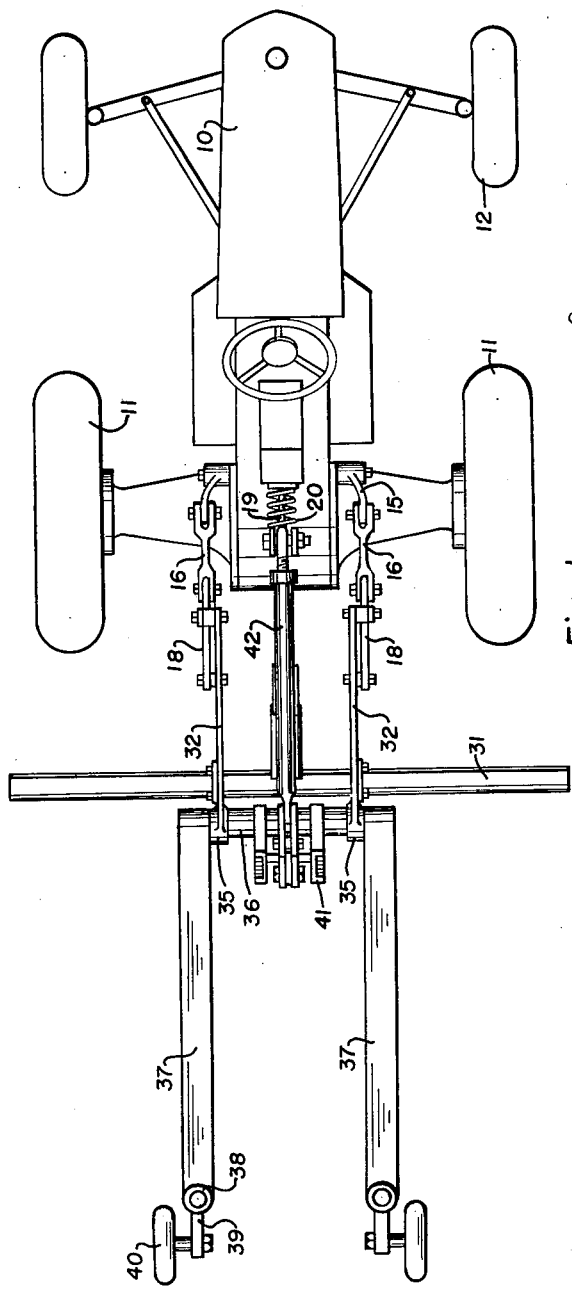
Fig. 1
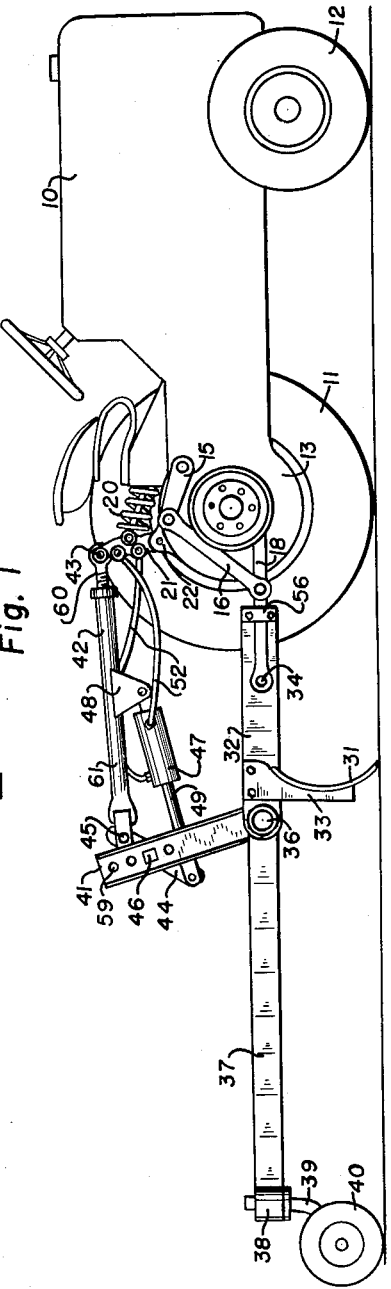
Fig. 2
INVENTOR.
Lawrence E. Shumaker
By
ATTORNEY May 8, 1962     L. E. SHUMAKER     3,032,902

TRACTOR-MOUNTED LAND LEVELER

Filed Oct. 3, 1960     2 Sheets-Sheet 2

INVENTOR.
Lawrence E. Shumaker

BY

ATTORNEY

United States Patent Office 3,032,902
Patented May 8, 1962

3,032,902
TRACTOR-MOUNTED LAND LEVELER
Lawrence E. Shumaker, Denver, Colo., assignor to Eversman Manufacturing Co., Denver, Colo., a corporation of Colorado
Filed Oct. 3, 1960, Ser. No. 59,970
7 Claims. (Cl. 37—180)

This invention relates to a tractor-mounted land leveler for attachment to a conventional farm tractor having hydraulically-actuated implement linkage of the type known to the trade as the "Ferguson System."

The principal object of the invention is to provide an exceedingly simple, lightweight, economical and highly efficient land leveling blade which can be quickly and easily mounted on a tractor of the above type to automatically cut away high areas and fill in low areas so as to quickly and accurately bring a field to a smooth level condition.

Another object of the invention is to provide a leveling blade control for tractor-mounted land leveling devices which will be automatically controlled from the hydraulic system of the tractor to maintain the blade in a predetermined plane regardless of vertical movements of the tractor and to provide hydraulic regulating and adjusting means for presetting the blade in the desired plane.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a top plan view illustrating the improved land leveler attachment mounted on a conventional farm tractor having the "Ferguson System" of linkage;

FIG. 2 is a side view thereof with the near drive wheel of the tractor removed so as to expose the operating parts of the improved land leveler;

Figure 4:
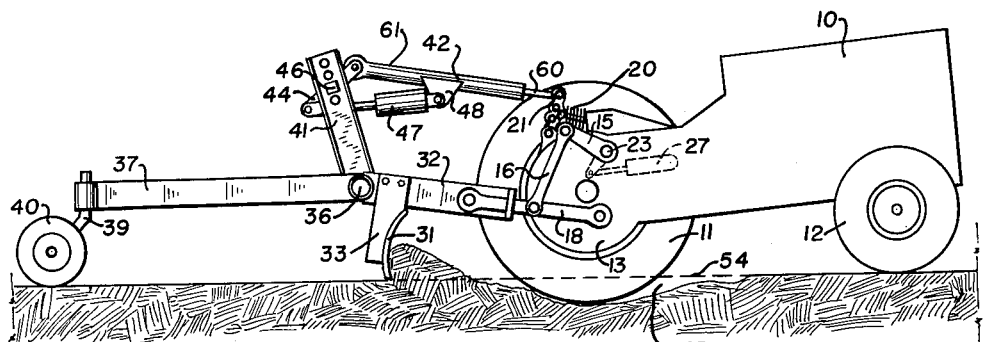
FIG. 4 is a similar diagrammatic side view illustrating the action of the leveler when a low spot is encountered.
Figure 5:
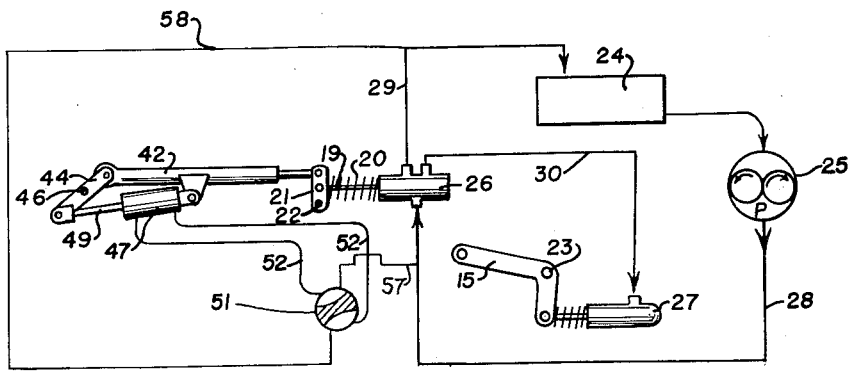
FIG. 5 is a flow diagram of the hydraulic circuits employed in this invention.

In FIGS. 1 and 2 only sufficient elements of a tractor 10 are illustrated to show the manner of mounting the improved land leveler thereon. In FIGS. 4 and 5, the elements of the tractor and the improved leveler are simply outlined for diagrammatic purposes.

Conventional elements of the tractor are designated by numeral as follows: rear drive wheels 11, front wheels 12, differential gear housing 13, rear axle housing 14, hydraulic lift arms 15, hydraulic lift links 16, lower implement attachment studs 17, draw bar arms 18, master control valve stem 19, control valve spring 20, valve-actuating lever member 21, valve lever lug on gear housing 22, lift arm pivot shaft 23, hydraulic reservoir 24, hydraulic pump 25, master control valve 26, lift arm hydraulic cylinder 27, hydraulic pressure line 28, hydraulic return line 29, and a cylinder pressure line 30.

For general use, a farm implement is connected to the draw bar arms 18 and an upper link member is connected from the upper portion of the implement to the valve-actuating lever member 21. Should the implement encounter an obstruction causing extreme draw bar resistance, it will tend to tilt forwardly to actuate the lever member 21 forwardly, against the bias of the control valve spring 20 to connect the cylinder feed line 30 with the pressure line 28 to cause the hydraulic cylinder 27 to rotate the lift arm pivot shaft 23 so as to swing the lift arm 15 upwardly to lift the implement and reduce the draw bar drag on the tractor.

This invention is designed to make use of the above described hydraulic control for maintaining a land leveling blade on a uniform plane. The improved leveler employs a transversely-extending leveling blade 31 of arcuate cross section. Two longitudinally-extending, spaced-apart draw bar arm extension members 32 are fixedly mounted on the blade 31 in any desired manner, such as by means of vertical bracket members 33 welded or otherwise secured to the blade 31 and bolted or otherwise secured to the extension members 32, so as to extend forwardly from the blade so as to move as a unit with the draw bar arms 18.

The rear extremities of the draw bar arms 18 of the tractor are secured to the extension members 32 of the blade by means of suitable attachment bolts 34 and the forward extremities of the extension members 32 are fixedly clamped to the draw bar arms 18 by means of suitable clamp straps 56 so that the leveling blade will be maintained parallel to and rearwardly of the axis of the rear tractor wheels 11. The rear extremities of the extension members 32 terminate in transversely aligned bearing sleeves 35.

A horizontal hinge tube 36 extends through and is rotatable in the bearing sleeves 35. A hollow, rearwardly-extending side arm 37 is welded to or otherwise fixedly secured upon each extremity of the hinge tube 36. The side arms 37 are similar and extend rearwardly in a common plane terminating at their rear extremities in vertical caster bearings 38. A caster wheel bracket 39, extending upwardly from suitable caster wheels 40, is rotatably mounted in each of the vertical caster bearings 38 to support the rear extremities of the side arms. Two spaced-apart mast members 41 are welded to the hinge tube 36 in spaced-apart relation at the midpoint of the latter so as to rotate in fixed relation with the side arms 37.

A compression link member 42 is pivotally mounted at its forward extremity on a hinge bolt 43 in the valve-actuating lever member 21 and extends rearwardly therefrom. A tiltable length-adjusting link 44 is pivoted upon a suitable bolt 45 at the rear extremity of the compression link 42 and extends downwardly therefrom between the two mast members 41 where it is pivotally secured by means of a pivot bolt 46 extending medially through the adjusting link 44 and through the two mast members 41. A hydraulic depth-adjusting cylinder 47 is pivotally mounted on the compression link member 42 upon suitable bracket members 48 and a hydraulic plunger 49 extends rearwardly from the cylinder 47 to a wrist pin 50 in the lower extremity of the length adjusting link 44. The opposite extremities of the cylinder 47 are hydraulically connected to the opposite sides of a standard three-way hydraulic control valve 51 by means of suitable hydraulic hoses 52. The valve 51 can be mounted on the tractor in any desired manner within convenient reach of the operator and is connected to the hydraulic pressure line 28 through the medium of a feed line 57, and to the reservoir 24 by means of a connection 58 with the return line 29, as shown in FIG. 5.

It can be seen that extension or retrievement of the plunger 49 will result in varying the effective length of the compression link 42 between the hinge bolt 43 and the pivot bolt 46. For instance, if hydraulic fluid be admitted to the forward extremity of the cylinder 47, the result will be to force the plunger 49 and the adjusting link 44 rearwardly to increase the effective length of the compression link member 42 so as to swing the upper extremities of the mast members 41 rearwardly. This rearward movement of the mast members acts to pry the hinge tube 36 upwardly, the caster wheels 40 acting as a fulcrum, to raise the leveling blade 31. If hydraulic fluid be admitted to the rear extremity of the cylinder 47, the mast members 41 will be swung forwardly at their upper extremities resulting in a lowering of the blade 31. Thus, it can be seen that the level upon which the blade 31 will travel with reference to the front wheels 12 and the caster wheels 40 can be manually regulated and preset by manipulation of the hydraulic control valve 51.

Figure 3:
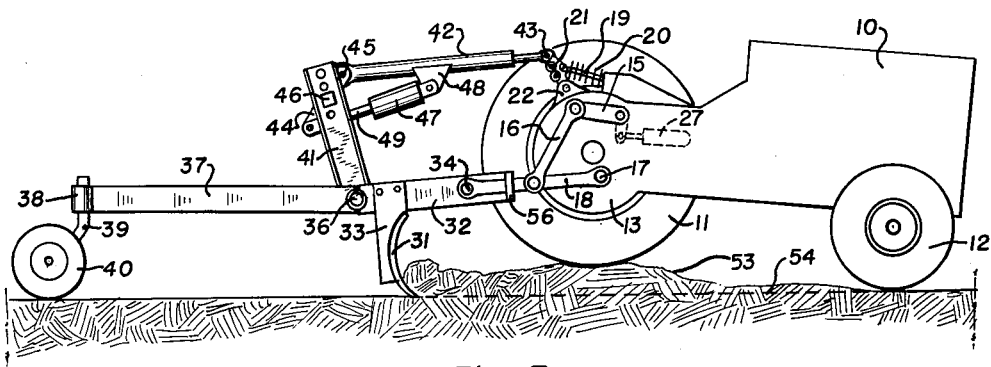
FIG. 3 is a diagrammatic side view illustrating the action of the leveler when the rear tractor wheels are passing over a high spot in a field.

Let us assume that the depth-adjusting cylinder 47 has been adjusted to place the lower or cutting edge of the leveling blade 31 on a plane 54 level with the ground engaging surfaces of the front wheels 12 and the caster wheels 40, as shown in FIG. 2. Now let us assume that the tractor 10 is being driven forwardly over a field and that a high spot in the field, such as indicated at 53 in FIG. 3, is encountered. This will force the rear tractor wheels 11 upwardly causing the valve lever lug 22 and the master control valve 26 to swing forwardly from the mast members 41. This forward movement will actuate the hydraulic valve 26 to allow hydraulic fluid to escape from the hydraulic cylinder 27 to flow through the return line 29 to the reservoir 24. This will allow the lift arms 15 to swing downwardly to lower the blade 31 relative to the rear wheels of the tractor so that it will maintain the original plane so as to scrape away the high spot 53.

Now let us assume that the rear wheels 11 travel into a low spot or depression 55, as indicated in FIG. 4. This causes the valve lever lug 22 and the master control valve 26 to swing rearwardly toward the mast members 41 so as to force the valve stem 19 inwardly to actuate the master valve 26 so as to cause the latter to connect the cylinder feed line 30 with the hydraulic pressure line 28. Hydraulic pressure will now flow to the cylinder 27 causing the latter to swing the lift arms 15 upwardly so as to raise the blade 31 relative to the rear wheels of the tractor so that it will maintain its original level plane 54 and fill the depression 55, as shown in FIG. 4.

It will be noted that the downward movement of the hydraulic lift arms 15 in FIG. 3 ceases the instant the rear wheels cease to rise and the upward movement of the hydraulic lift arms 15 ceases the instant the rear wheels cease to descend in FIG. 4. Therefore, the lower edge of the blade 31 constantly remains on the preset level plane, as indicated by the ground line 54 in FIGS. 3 and 4.

Various adjustments are provided for adjusting the leveling attachment to differing types of tractors and to differing types of jobs. For instance, the mast members 41 are provided with a plurality of spaced holes 59 for receiving the pivot bolt 46 so that the leverage moment arm can be adjusted to suit field conditions. The compression link member 42 is also preferably adjustable to preset length by forming the link member from a rod 60 threaded into a tubular barrel 61.

While a specific form of the improvement has been described and illustrated herein, it is to be understood that the same may be varied within the scope of the appended claims, without departing from the spirit of the invention.

For instance, the caster wheel frame has for convenience been illustrated with the mast 41 affixed to and extending upwardly from the forward extremity of the plane of the side arms 37. An alternate and equivalent construction having exactly the same functional result could be obtained by inclining the side arms upwardly to a position corresponding to the top of the mast 41 thence downwardly to a pivotal connection with the extension members 32.

Figure 6:
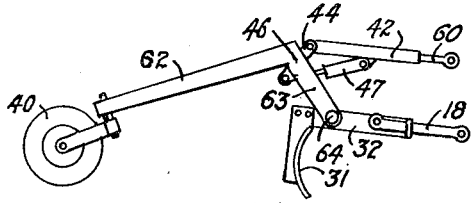
FIG. 6 is a diagrammatic side view illustrating an equivalent construction.

Such a variation is diagrammatically indicated in FIG. 6 wherein side arms 62 extend forwardly and upwardly from the caster wheels 40 to a fixed connection with the upper extremity of a mast frame 63 which extends downwardly to a pivotal connection 64 with the extension members 32 previously described. The remaining elements are unchanged and the mast frame 63 corresponds to the previously described mast 41. Therefore, the term "mast member" as used herein refers to any fixed means for supporting the pivot 46 elevated above the pivotal connection of the caster wheel frame to the extension members 32.

Having thus described the invention what is claimed and desired secured by Letters Patent is:

1. A land leveling attachment for farm tractors, of the type having pivotally-mounted rearwardly-extending draw bar arms suspended from lift links which are hydraulically swung upwardly and downwardly by hydraulic means controlled by a hydraulic control valve, comprising: a scraper frame structure; means for attaching said scraper frame structure to said draw bar arms so that the former will move as a unit with the latter; an earth scraper blade carried by said scraper frame structure; a trailing frame structure pivotally mounted at its forward extremity on said scraper frame structure and extending rearwardly therefrom; ground engaging means at the rear extremity of said trailer frame structure; a mast element affixed to and extending upwardly from said trailer frame structure; a compression link member; and means for securing said compression link member to and between said mast element and said hydraulic control valve to actuate said control valve in consequence of relative vertical movements between said tractor and said ground-engaging means so as to cause said hydraulic means to actuate said lift links to maintain said blade on a predetermined plane.

2. A land leveling attachment as described in claim 1 having means for varying the length of said compression link to preset the height of said scraper blade.

3. A land leveling attachment as described in claim 2 in which the means for varying the length of said compression link is hydraulically actuated from a remote control.

4. A land leveling attachment as described in claim 2 in which the means for varying comprises: a length adjusting link pivoted at forward extremity to said compression link and extending rearwardly therefrom; a hydraulically expansible device pivotally connected between the rear extremity of said length adjusting link and said compression link so that contraction of said expansible device will swing said length adjusting link forwardly, said length adjusting link being pivoted intermediate its extremities to said mast element.

5. A land leveler comprising: a farm tractor of the type having pivotally-mounted rearwardly-extending draw bar arms suspended from lift links which are hydraulically swung upwardly and downwardly by hydraulic means controlled by a hydraulic control valve; a scraper frame structure; means attaching said scraper frame structure to said draw bar arms so that the former will move as a unit with the latter; an earth scraper blade carried by said scraper frame structure; a trailing frame structure pivotally mounted at its forward extremity on said scraper frame structure and extending rearwardly therefrom; ground engaging means at the rear extremity of said trailer frame structure; a mast element affixed to and extending upwardly from said trailer frame structure; a compression link member; and means securing said compression link member to and between said mast element and said hydraulic control valve to actuate said control valve to consequence of relative vertical movements between said tractor and said ground-engaging means so as to cause said hydraulic means to actuate said lift links to maintain said blade on a predetermined plane.

6. A land leveler as described in claim 5 in which the trailing frame structure comprises a horizontal hinge tube rotatably supported on and transversely of said scraper frame; a side arm extending rearwardly from each extremity of said hinge tube in a common plane; and ground engaging wheels at the rear extremities of said side arms.

7. A land leveler as described in claim 5 in which the scraper frame structure comprises: two forwardly-extending, parallel extension members; bracket members securing said blade to and below said extension members; bearings carried by said extension members to provide a pivotal mounting for said scraper frame structure; and means for securing each of said extension members to one of said draw bar arms.

References Cited in the file of this patent

UNITED STATES PATENTS

| | | |
|---|---|---|
| 2,687,681 | Phenice | Aug. 31, 1954 |
| 2,862,341 | Miller | Dec. 2, 1958 |
| 2,994,977 | Shumaker et al. | Aug. 8, 1961 |